United States Patent
Miyaji et al.

(10) Patent No.: US 7,102,290 B2
(45) Date of Patent: Sep. 5, 2006

(54) DISCHARGE LIGHT-EMITTING DEVICE AND CONTACT IMAGE SENSOR UTILIZING THE SAME

(75) Inventors: Minoru Miyaji, Tokyo (JP); Akira Ota, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 138 days.

(21) Appl. No.: 10/724,694

(22) Filed: Dec. 2, 2003

(65) Prior Publication Data
US 2005/0017625 A1   Jan. 27, 2005

(30) Foreign Application Priority Data
Jul. 25, 2003   (JP) .............................. 2003-280146

(51) Int. Cl.
H01J 11/00   (2006.01)
H01J 11/02   (2006.01)
H01J 61/06   (2006.01)

(52) U.S. Cl. .................. 313/607; 313/234; 313/496; 313/485

(58) Field of Classification Search ............... 313/485, 313/487, 607, 234
See application file for complete search history.

(56) References Cited

U.S. PATENT DOCUMENTS

| | | | | |
|---|---|---|---|---|
| 5,463,276 A | * | 10/1995 | Kawasaki et al. | 313/496 |
| 5,742,122 A | * | 4/1998 | Amemiya et al. | 313/582 |
| 6,583,554 B1 | * | 6/2003 | Lee | 313/495 |
| 6,674,061 B1 | * | 1/2004 | Arimoto | 250/208.1 |
| 2002/0079827 A1 | * | 6/2002 | Park | 313/485 |
| 2003/0146699 A1 | * | 8/2003 | Lee | 313/582 |
| 2004/0178731 A1 | * | 9/2004 | Takeda et al. | 313/607 |
| 2005/0194903 A1 | * | 9/2005 | Minamoto et al. | 313/607 |

FOREIGN PATENT DOCUMENTS

| | | |
|---|---|---|
| JP | 59-31154 | 2/1984 |
| JP | 2588417 | 1/1999 |
| JP | 2002-134064 | 5/2002 |

\* cited by examiner

*Primary Examiner*—Mariceli Santiago
*Assistant Examiner*—Elizabeth Rielley
(74) *Attorney, Agent, or Firm*—Oblon, Spivak, McClelland, Maier & Neustadt, P.C.

(57) ABSTRACT

A discharge light-emitting device includes a transparent first substrate, at least two first electrodes formed on the first substrate, a transparent second substrate, at least two second electrodes formed on the second substrate, sidewalls configured to form a discharge space with the first substrate and the second substrate so that the at least two second electrodes are inside the discharge space, at least two first fluorescent layers formed on a discharge space side of the first substrate, and at least two second fluorescent layers formed on a discharge space side of the second substrate.

16 Claims, 6 Drawing Sheets

DISCHARGE LIGHT-EMITTING DEVICE AND CONTACT IMAGE SENSOR UTILIZING THE SAME

BACKGROUND OF THE INVENTION

1. Field of the Invention

The present invention relates to a discharge light-emitting device that emits light due to discharge at a space between electrodes charged with any discharge gas such as xenon, and to a contact image sensor utilizing the discharge light-emitting device as a light source.

2. Description of the Related Art

Hitherto, a discharge light-emitting device utilizing spontaneous discharge of gas, with which a space between electrodes is charged, has been known as a light source employed in a contact image sensor for reading graphic form or the like. Generally in the contact image sensor, any original held between a platen and a glass plate is irradiated with a discharge light-emitting device, and reflected light thereof passing through a rod lens array is transformed into electrical signals, thus the original comes to be read.

This known discharge light-emitting device is constructed such that any discharge gas such as xenon is charged into a space between two substrates opposed to each other. When ac current of about 1 to 2 KV is applied to the space between electrodes disposed on each substrate, discharge gas is ionized and discharges ultra-violet rays by which a fluorescent substance is energized and emits light.

FIG. 6 is a cross-sectional view showing a conventional discharge light-emitting device disclosed in the Japanese Patent Publication (unexamined) No. 2002-134064. Referring to this drawing, a discharge light-emitting device 1 includes a first substrate 2 composed of a glass plate. A first electrode 3 is formed on this first substrate 2. A dielectric layer 4 is formed on the first substrate 2 so as to cover the first electrode 3. A second substrate 6 includes a recess formed by a flat facing part 6a, an inclined part 6b and a leg part 6c. The second substrate 6 is mounted on the first substrate 2, thus forming a discharge space 9 with the recess.

A second electrode 7 is formed on the external surface opposite to the discharge space 9 formed on the second substrate 6. In the discharge space 9, a fluorescent layer 5 is composed of a lower fluorescent substance layer formed on the dielectric layer 4 and an upper fluorescent substance layer formed on the second substrate 6. A sealing layer 8 forms the discharge space 9 through bonding the first substrate 2 and the second substrate 6. The discharge space 9 is charged with any discharge gas such as xenon. The inclined part 6b is formed at a portion joining to the facing part 6a of the second substrate 6 and to the first substrate 2 so as to make about 45 degrees with respect to the facing part 6a of the second substrate 6. The fluorescent layer 5 is not formed at the discharge space 9 portion on this inclined part 6b. Accordingly, discharge light generated in the discharge space 9 outgoes through the inclined part 6b to outside.

The first substrate 2 is rectangular in external shape, and the rectangular first electrode 3 is formed in the longitudinal direction thereof. One end in the longitudinal direction of this first electrode 3 is connected to a high voltage power source located outside. The dielectric layer 4 is rectangular in external shape covering the first electrode 3. The fluorescent layer 5 is rectangular in shape and is formed on the dielectric layer 4.

FIG. 7 is a sectional view showing a construction of a contact image sensor in which the discharge light-emitting device shown in FIG. 6 is used as a light source. In the drawing, the discharge light-emitting device 1 acts as a light source of a contact image sensor 10. Referring to FIGS. 6 and 7, a housing 12 includes a mounting part 18 on which the discharge light-emitting device 1 is mounted, and supports horizontally thereon the first substrate 2 of the discharge light-emitting device 1. A glass plate 15 is also supported on the housing, and the second substrate 6 of the discharge light-emitting device 1 is disposed in close contact with the lower side of the glass plate 15. The inclined part 6b of the discharge light-emitting device 1 is disposed at a position near the irradiation point of an original 16 carried by a platen roller. On the supposition that inclination of the inclined part 6b is 45 degrees, light outgoing from this inclined part 6b comes to be the irradiation point. As indicated by the arrows in the drawing, the light reflected from the original 16 is converged through into the rod lens array 14, and contents of the original 16 are read through photoelectric transfer by a sensor 13 mounted on the circuit board 11.

In general, brightness at the original surface (original surface illuminance) is in proportion to brightness of light source and in inverse proportion to the square of distance between light source and original surface. Therefore, if it is possible to shorten the distance between the light-emitting surface of the light source and the original surface, the original surface illuminance can be increased even in the case of using the light source of the same brightness. Further, when reducing unnecessary space between the light source and original, it becomes possible to restrain disturbance due to reflection and disperse from the portions other than the original to be read, thereby enabling to read the original with high accuracy.

However, in the construction in which the discharge light-emitting device 1 is built in only on one side of the rod lens array 14 as shown in FIG. 7, a shadow may be projected due to corrugation or level difference in the original 16. This shadow may make the read contents of the original 16 indefinite or unclear, and moreover brightness of the discharge light-emitting device 1 may be insufficient. To cope with this problem, it may be an idea that the discharge light-emitting device 1 is built in on each of the two sides of the rod lens array 14. It is certain that, as a result of such arrangement, the indefiniteness due to the shadow of corrugation is overcome, and brightness is improved. But a problem exists in that increase in cost is unavoidable.

SUMMARY OF THE INVENTION

The present invention was made to solve the above-discussed problem and has an object of providing a discharge light-emitting device capable of increasing brightness by disposing light sources of fluorescent layer integrally formed on two sides and reducing cost. The invention also provides a contact image sensor using the discharge light-emitting device as light source.

To accomplish the foregoing objects, a discharge light-emitting device according to the invention includes:

a transparent first substrate;

first electrodes formed on the mentioned first substrate in parallel while a central part extending in longitudinal direction of the first substrate being left as a clearance;

a transparent second substrate;

second electrodes formed on the mentioned second substrate in parallel while a central part extending in longitudinal direction of the second substrate being left as a clearance;

a container forming a discharge space by the mentioned first substrate, the mentioned second substrate being opposite to said first substrate so that said first electrodes and said second electrodes are opposite to each other, and sidewalls;

first fluorescent layers formed on the discharge space side of the mentioned first substrate in parallel so as to be opposite to the mentioned first electrodes while a central part extending in longitudinal direction of the first substrate being left as a clearance; and second fluorescent layers formed on the discharge space side of the mentioned second substrate in parallel so as to be opposite to the mentioned second electrodes while a central part extending in longitudinal direction of the second substrate being left as a clearance.

In this discharge light-emitting device, light emitted from said fluorescent layers on both sides of the central part extending in longitudinal direction of the mentioned substrate is reflected from an original located on opposite side of the discharge space of the mentioned second substrate. Then the reflected light passes through the central part extending in longitudinal direction of the mentioned substrate and reaches the opposite side of the discharge space of the mentioned first substrate.

As a result, in the discharge light-emitting device of above construction, brightness can be improved by the light sources integrally formed on both sides and, furthermore, it is possible to restrain increase in cost.

In the discharge light-emitting device according to the invention, clearance of the central part extending in parallel to each other in longitudinal direction between one first fluorescent layer and another is preferably shorter than that of the central part extending in parallel in longitudinal direction between one second fluorescent layer and another.

As a result, in the discharge light-emitting device of above construction, it becomes possible for the light emitted from the first fluorescent layers on both sides to outgo effectively through the central part extending in longitudinal direction of the second substrate.

In the discharge light-emitting device according to the invention, the second substrate acts also as a glass plate on which an original to be read is carried.

As a result, in the discharge light-emitting device of above construction, not only the distance between the first fluorescent layers acting as light source and the original can be shorten, but also the discharge light-emitting device can be small-sized.

A contact image sensor according to the invention includes:

a transparent first substrate;

first electrodes formed on the mentioned first substrate in parallel while a central part extending in longitudinal direction of the first substrate being left as a clearance;

a transparent second substrate;

second electrodes formed on the mentioned second substrate in parallel while a central part extending in longitudinal direction of the second substrate being left as a clearance;

a container forming a discharge space by the mentioned first substrate, the mentioned second substrate being opposite to said first substrate so that said first electrodes and said second electrodes are opposite to each other, and sidewalls;

first fluorescent layers formed on the discharge space side of the mentioned first substrate in parallel so as to be opposite to the mentioned first electrodes while a central part extending in longitudinal direction of the first substrate being left as a clearance;

second fluorescent layer formed on the discharge space side of the mentioned second substrate in parallel so as to be opposite to the mentioned second electrodes while a central part extending in longitudinal direction of the second substrate being left as a clearance; and a converging lens that is disposed on the opposite side of the discharge space in the central part extending in longitudinal direction of the mentioned first substrates, and converges light reflected from the original; and a sensor for detecting the light reflected from the mentioned lens.

In this discharge light-emitting device, light emitted from said fluorescent layers on both sides of the central part extending in the longitudinal direction of the mentioned substrate is reflected at an original located on opposite side of the discharge space of the mentioned second substrate. Then the reflected light passes through the central part extending in the longitudinal direction of the mentioned substrate, and comes to be converged into the mentioned lens disposed on the opposite side of the discharge space in the mentioned first substrate. The mentioned sensor detects the converged reflected light.

As a result, in the discharge light-emitting device of above construction, brightness can be improved by the light sources, being the fluorescent layers, integrally formed on both sides and, furthermore, it is possible to restrain increase in cost.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
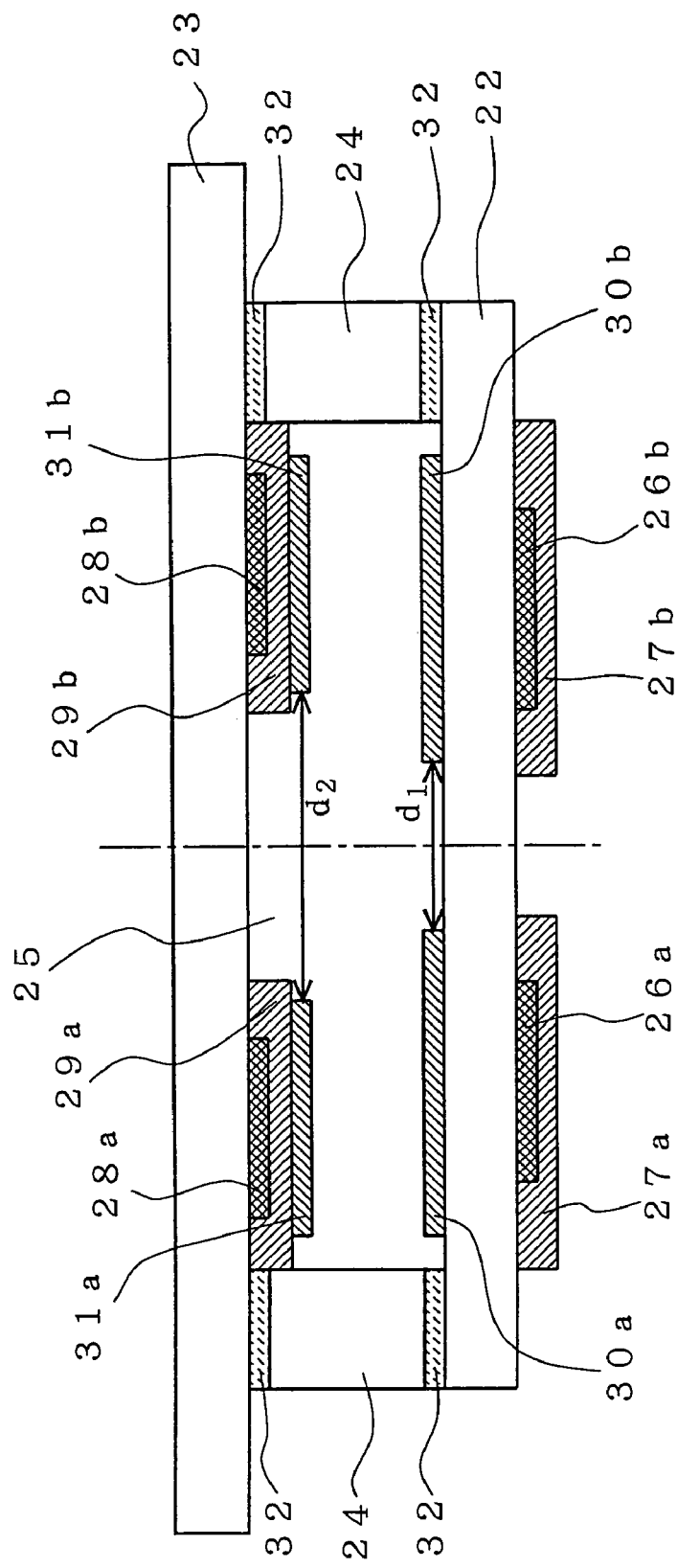
FIG. 1 is a sectional view showing a construction of a discharge light-emitting device according to Embodiment 1 of the present invention.
Figure 2:
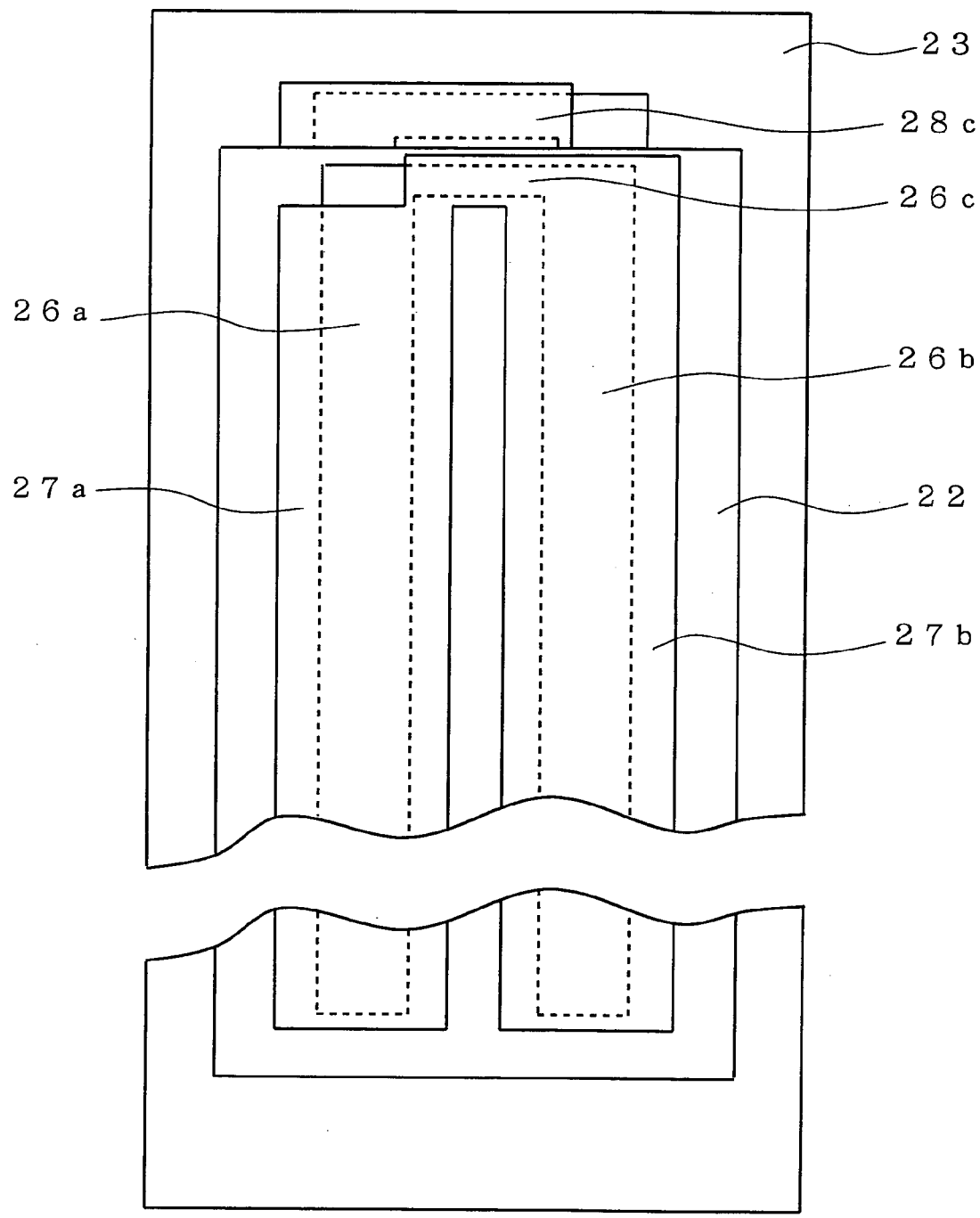
FIG. 2 is an external plan view taken from the first substrate side.

FIG. 1 is a sectional view showing a construction of a discharge light-emitting device according to Embodiment 1 of the present invention, and FIG. 2 is an external plan view taken from the first substrate side. Referring to the drawings, a discharge light-emitting device 21 includes a first substrate 22 composed of a transparent glass plate, a second substrate 23 composed of a transparent glass plate, and a side wall 24 composed of a glass. A container structure covered by those members forms a discharge space 25. As shown in FIGS. 1 and 2, two trains of long and narrow rectangular first electrodes 26a, 26b are formed on the first substrate 22 in parallel at parts located on the opposite side of the discharge space in the long and narrow rectangular first substrate 22 while a central part extending in longitudinal direction of the first substrate 22 being left as a clearance. In other words, the substrates are formed enclosing the central parts between them. The first electrodes 26a, 26b are connected to each other at one end thereof in the longitudinal direction, thus a connection part 26c being formed. This connection part 26c is connected to a high voltage power source located outside. In addition, the first electrodes 26a, 26b are composed of a metal of good conductivity such as Ag, Cu, Al.

Long and narrow rectangular dielectric layers 27a, 27b are formed on the first substrate 22 in parallel so as to cover the first electrodes 26a, 26b while a central part extending in longitudinal direction of the first substrate 22 being left as a clearance and a part of the connection part 26c being exposed. The dielectric layers 27a, 27b are composed of an insulating material of which principal components are bismuth oxide and zinc oxide. The dielectric layers 27a, 27b serve as insulating layer. It is also preferable that any separate insulating board extends along. The dielectric layers 27a, 27b act as light shielding layer of which color tone is, for example, black. In the construction in which the first electrodes 26a, 26b are formed on the opposite side of the discharge space in the first substrate 22, the dielectric layers 27a, 27b is preferably formed of insulating material of organic resin such as silicon.

Two trains of long and narrow rectangular first electrodes 28a, 28b are formed on the second substrate 23 in parallel on the discharge space 25 side thereof at parts facing the first electrodes 26a, 26b while a central part extending in longitudinal direction of the first substrate 22 being left as a clearance. The second electrodes 28a, 28b are connected to each other at one end thereof in the longitudinal direction, thus a connection part 28c being formed. The connection part 28c protrudes outside of the sidewall 24, and connected to a high voltage power source outside. This connection part 28c is connected to a high voltage power source located outside. In addition, the second electrodes 28a, 28b are composed of a metal of good conductivity such as Ag, Cu, Al. As shown in FIG. 1, clearance of the central part separating the first electrodes 26a, 26b from each other is shorter than that of the central part separating the second substrates 28a, 28b in longitudinal direction and is located nearer to the center (indicated by the one-dot chain line).

Long and narrow rectangular dielectric layers 29a, 29b are formed on the second substrate 23 in parallel so as to cover the second electrodes 28a, 28b while a central part extending in longitudinal direction of the second substrate 23 being left as a clearance and a part of the connection part 28c being exposed. The long and narrow rectangular dielectric layers 29a, 29b cover also portions where the second electrodes 28a, 28b protrude outward and the second substrate 23 and the sidewall 24 are adhered to each other. The dielectric layers 29a, 29b are composed of an insulating material of which principal components are bismuth oxide and zinc oxide. The dielectric layers 29a, 29b act as light shielding layer of which color tone is, for example, black. In addition, the second electrodes 28a, 28b may be formed on the opposite side of the discharge space in the second substrate 23 when required. In such a case, it is also preferable that any separate insulating board extends along. As shown in FIG. 1, clearance of the central part separating the first electrodes 27a, 27b from each other is shorter than that of the central part separating the second substrates 29a, 29b in longitudinal direction and is located nearer to the center (indicated by the one-dot chain line). As a result of such arrangement, it becomes possible to restrain any disturbance due to reflection and disperse from the portions other than the original to be read in cooperation with the shielding function of the dielectric layers of which color tone is black.

Two trains of long and narrow rectangular first fluorescent layers 30a, 30b are formed on the first substrate 22 in parallel being opposite to the first electrodes 26a, 26b while a central part extending in longitudinal direction of the first substrate 22 being left as a clearance on the discharge space side of the first substrate 22. The first fluorescent layers 30a, 30b serve as fluorescent member on the lower layer. Two trains of long and narrow rectangular second fluorescent layers 31a, 31b are formed on the second substrate 23 in parallel being opposite to the second electrodes 28a, 28b while a central part extending in longitudinal direction of the second substrate 23 being left as a clearance on the discharge space side of the second substrate 23. The first fluorescent layers 31a, 31b serve as fluorescent member on the upper layer. As shown in FIG. 1, a clearance d1 of the central part separating the first fluorescent layers 30a, 30b from each other is shorter than a clearance d2 of the central part separating the second fluorescent layers 31a, 31b in longitudinal direction and is located nearer to the center.

The clearance of the central part separating the first electrodes 27a, 27b from each other is shorter than that of the central part separating the first fluorescent layers 30a, 30b in longitudinal direction and is located nearer to the center. Likewise the clearance of the central part separating the first electrodes 29a, 29b from each other is shorter than that of the central part separating the second fluorescent layers 31a, 31b in longitudinal direction and is located nearer to the center. In this manner, the clearance of the central part separating the mentioned dielectric layers extending in parallel in longitudinal direction is made shorter than that of the central part separating the mentioned fluorescent layers formed in parallel on the same substrate as for the mentioned dielectric layers. As a result, the light emitted from the fluorescent layers themselves can effectively shield the light reflected from the backside of the fluorescent layers.

In addition, it is not always necessary that film thickness of the first fluorescent layers 30a, 30b is the same as that of the second fluorescent layers 31a, 31b. The first fluorescent layers 30a, 30b and second fluorescent layers 31a, 31b are about 40 µm in film thickness, and are formed into a reflection type so that the most intense light is emitted at the surface thereof. As for the relation between film thickness of fluorescent substance and light emission intensity, the light is generally emitted more as the fluorescent substance increases in film thickness. However, when the film thickness comes to be more than 40 µm, substantial light emission intensity is saturated with respect to the film thickness. Therefore, variation in light emission intensity becomes less with respect to the film thickness, and it becomes easy to obtain uniform and even distribution of light emission within the device. Consequently, the film thickness is preferably in the range of 40 to 60 µm in view of variation in light emission intensity of the fluorescent substance with respect to variation in film thickness, amount of materials, number of formation processes, etc.

A sealing layer 32 is composed of a glass layer (low softening point glass) formed by melting frit, and forms the discharge space 25 by bonding the first substrate 22 and the second substrate 23 interposing the glass side wall 24 between them. The discharge space 25 is filled with discharge gas such as xenon. When applying a high voltage power supply from outside to between the connection part 26c of the first electrodes 26a, 26b and the connection part 28c of the second electrodes 28a, 28b, the discharge gas in the discharge space 25 is ionized and discharges ultraviolet rays. The fluorescent substance is energized by the ultraviolet rays and comes to emit light. The second substrate 23 also serves as a glass plate (i.e., top plate glass) on the surface of which an original to be read is carried. The rectangular size of the second substrate 23 is formed to be larger than that of the first substrate 22. In this manner, the second substrate 23 of the discharge light-emitting device 21 serves also as a glass plate to be in contact with an original, and the discharge light emitting device and the mentioned glass plate are integrally formed. As a result, the discharge light emitting part and the original irradiation point come near to each other, thereby enabling not only improvement in illuminance at the illumination point but also small-sizing the device. In addition, the second substrate 23 may be separate from the top plate glass, when required.

Figure 3:
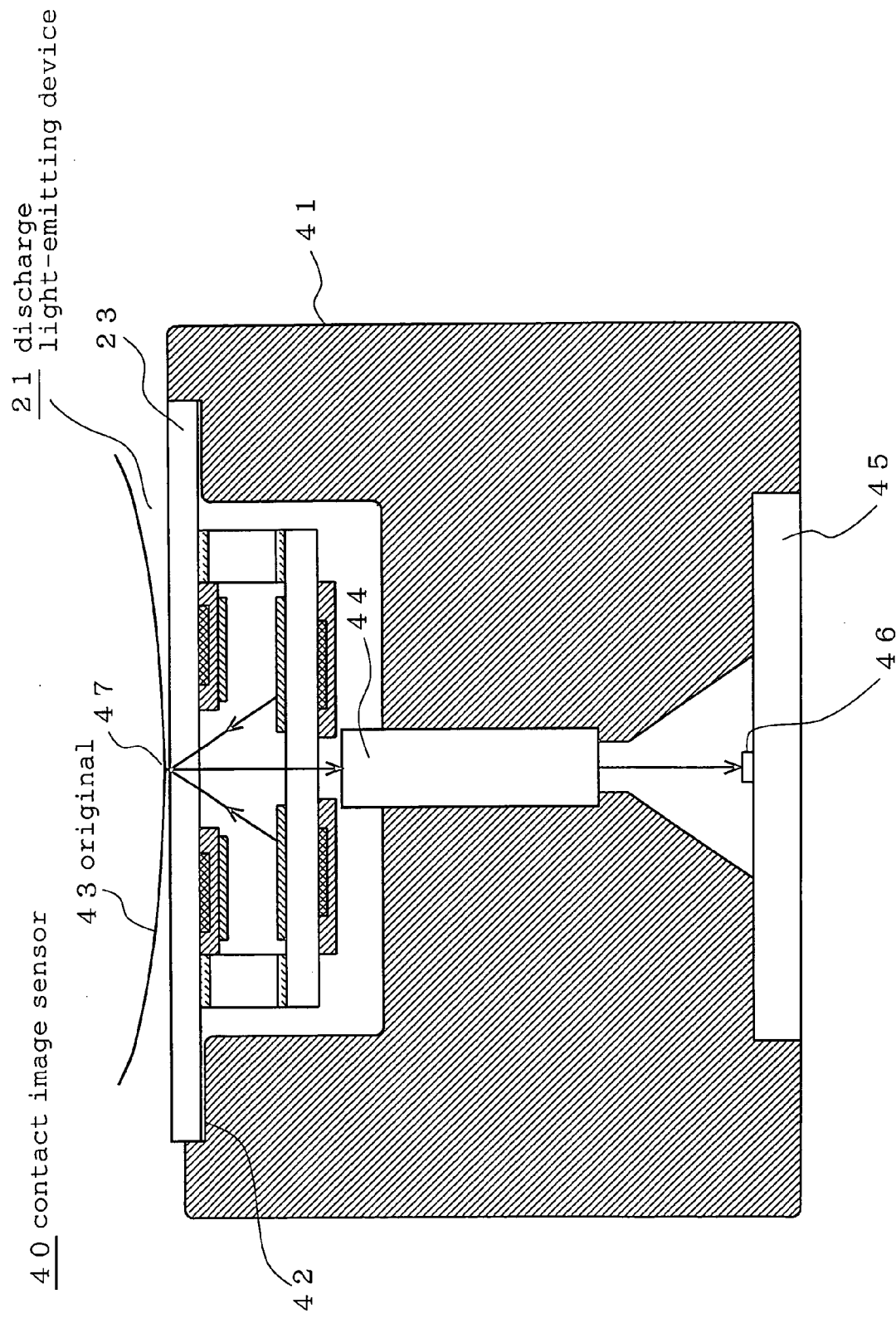
FIG. 3 is a sectional view of a contact image sensor in which the discharge light-emitting device shown in FIG. 1 is used as light source.

FIG. 3 is a sectional view showing a construction of a contact image sensor in which the discharge light-emitting device shown in FIG. 1 is used as light source. The discharge light-emitting device 21 acts as a light source of the contact image sensor 40. Referring to FIGS. 1 and 3, a housing 41 is composed of Al (aluminum) or resin such as PC (polycarbonate) and includes a mounting part on which outer peripheral portion of the second substrate 23 (glass plate) of the discharge light-emitting device 21 is mounted. The mounting part supports the discharge light-emitting device 21 horizontally. The second substrate 23 of the discharge light-emitting device 21 is utilized also as a glass plate to be in contact with an original 43 carried by the platen roller. Accordingly, the light emitting part of the discharge light-emitting device 21 and the irradiation point 47 at which the original 43 is irradiated are in a very near positional relation.

As indicated by the arrows in FIG. 3, light emitted from the fluorescent layers is reflected at the original 43. The reflected light is converged by a rod lens array (lens) 44, and photo-electrically transferred by a sensor 46 mounted on a circuit board 45, thus contents of the original 43 being read. This circuit board 45 is fixed to the housing 41 with a screw so as to be replaced with ease.

Figure 4:
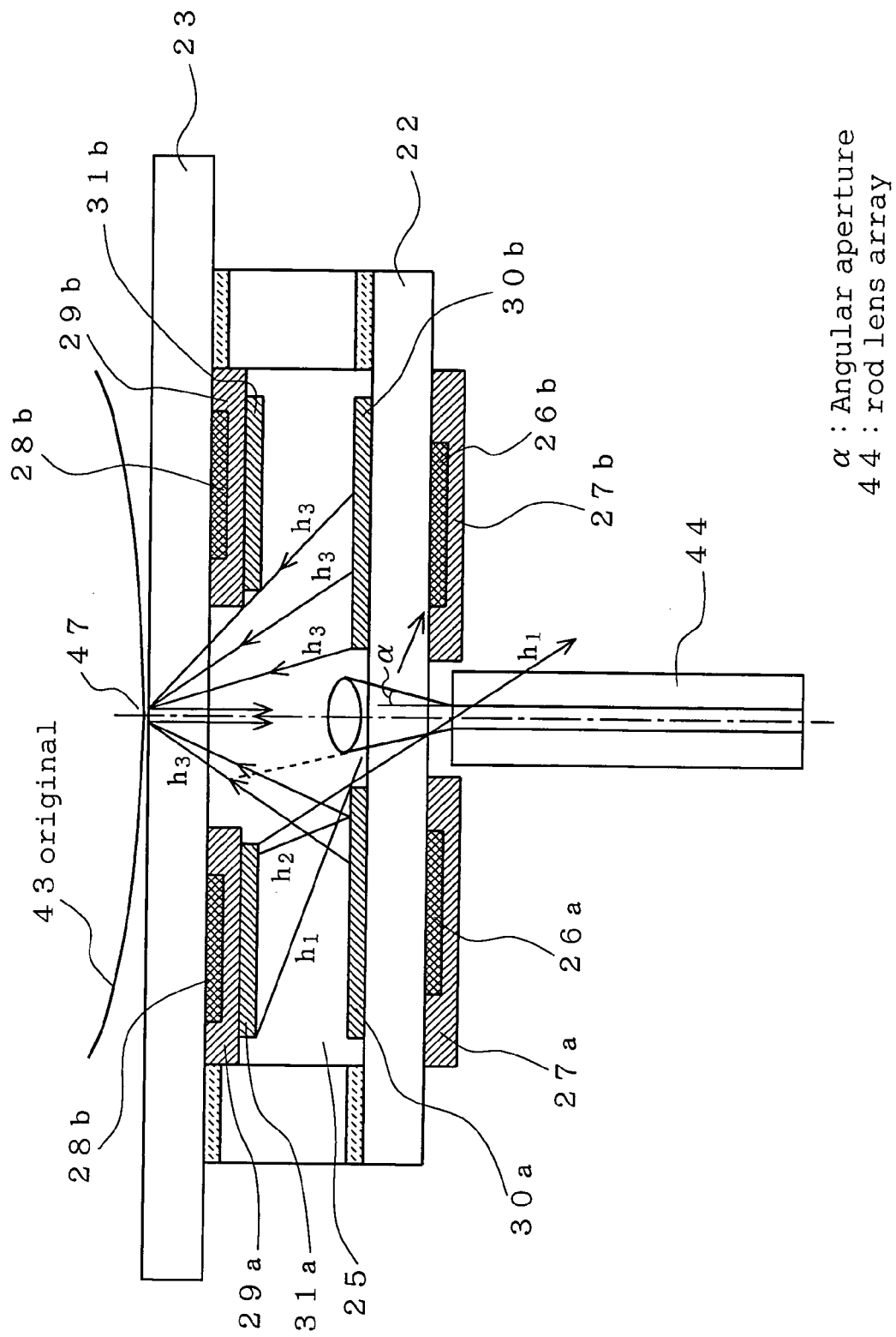
FIG. 4 is a view to explain the operation of reading an original using the discharge light-emitting device of FIG. 1.

FIG. 4 is a schematic view to explain the operation of reading an original using the discharge light-emitting device of FIG. 1. When applying a high voltage power supply from outside to between the connection part 26c of the first electrodes 26a, 26b and the connection part 28c of the second electrodes 28a, 28b, the discharge gas in the discharge space 25 is ionized and discharges ultraviolet rays. The fluorescent substance is energized by the ultraviolet rays and comes to emit light. On the other hand, the rod lens array 44 coated with resin is disposed vertically being opposite to the first substrate 22 between the first electrodes 26a, 26b of the first substrate 22. In other words, the rod lens array 44 is located at the center (indicated by the centerline in FIG. 4) between the dielectric layers 27a, 27b (central portion extending in longitudinal direction of the first substrate 22) as shown in FIG. 4. Angular aperture at which the rod lens array 44 receives light is generally small (narrow) and a indicated in FIG. 4 is, for example, 12°. Thus the rod lens array 44 receives light that incomes only at the angular range of not larger than 12°.

Therefore, a light h1 emitted from the fluorescent layers 31a, 31b of the second substrate 23 shown in FIG. 4 is not directly received on the rod lens array 44. On the other hand, a light h2 emitted from the fluorescent layers 31a, 31b of the second substrate 23 is reflected from fluorescent layers 30a, 30b and, after irradiation at the irradiation point 47 of the original 43, is received on the rod lens array 44. A light h3 emitted from the fluorescent layers 30a, 30b of the second substrate 23 is received on the rod lens array 44 after irradiation at the irradiation point 47 of the original 43. In this manner, the rod lens array 44 does not directly receive the light emitted from, but receives the light emitted from the fluorescent layers and reflected at the original 43.

A clearance d1 between the fluorescent layers 30a, 30b (see FIG. 1) is preferably shorter than the clearance d2 between the fluorescent layers 31a, 31b. As a result of such arrangement, most of the lights emitted from the fluorescent layers 30a, 30b outgoes effectively from the central part extending in longitudinal direction of the second substrate 23. Then, the irradiation point 47 of the original 43 is irradiated with the light, and the light is reflected and received on the rod lens array 44. In the drawing, center of distribution of quantity of light emitted from the fluorescent layers acting as a light source is located at the irradiation point 47 of the original 43. In addition, it is not preferable that the clearance d2 between the fluorescent layers 31a, 31b is made shorter (to come nearer to the center over the extension line (broken line) of the circular truncated cone) and the rod lens array 44 directly receives the light emitted from the fluorescent layers 31a, 31b.

Referring to FIG. 3, the discharge light-emitting device 21 built in the contact image sensor 40 is, for example, 327 mm in length and 3.2 to 5.2 mm in thickness to cover A3 size. In the mentioned thickness, the first substrate and second substrate are respectively 1.1 mm in thickness. The second substrate (glass plate to be in contact with original) is 25 mm in width. The second substrate 23 of the discharge light-emitting device 21 is utilized also as a glass plate to be in contact with an original. As a result, a distance from the fluorescent layers acting as a light source to the irradiation point 47 of the original 43 is shortened by the thickness of the second substrate (thickness of the glass plate), i.e., 1.1 mm×$\sqrt{2}$ in this example. Brightness on the original surface (illuminance of original surface) is in inverse proportion to the square of distance between light source and original surface. Therefore, the brightness is improved as the distance shortened.

As described above, in the invention, the light emitted from the mentioned fluorescent layers (first fluorescent layers 30, and second fluorescent layers 31) located on both sides of the central part extending in longitudinal direction of the mentioned substrates (first substrate 22 and second substrate 23) is reflected at the original 43 located on the opposite side of the discharge space of the second substrate 23. Then, the reflected light goes through the central part extending in longitudinal direction of the mentioned substrates (first substrate 22 and second substrate 23), i.e., goes through the central part of a container forming the discharge space, and is converged into the lens 44 disposed on the opposite side of the discharge space of the first substrate 22. The reflected light thus converged is then detected by the sensor 46. As a result, brightness can be improved due to the light sources being the integrally formed fluorescent layers on both sides, eventually making it possible to reduce the cost.

Embodiment 2

Figure 5:
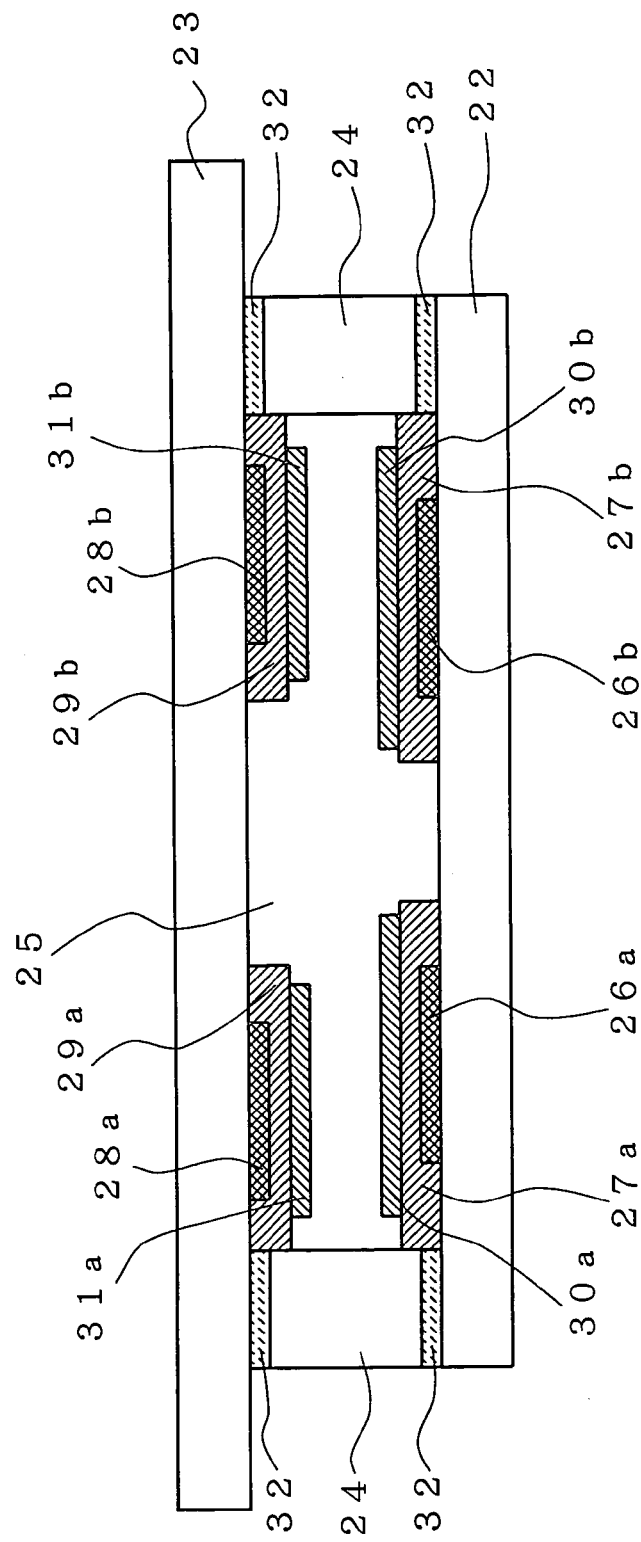
FIG. 5 is a sectional view showing a construction of another discharge light-emitting device according to Embodiment 2 of the invention.
Figure 6:
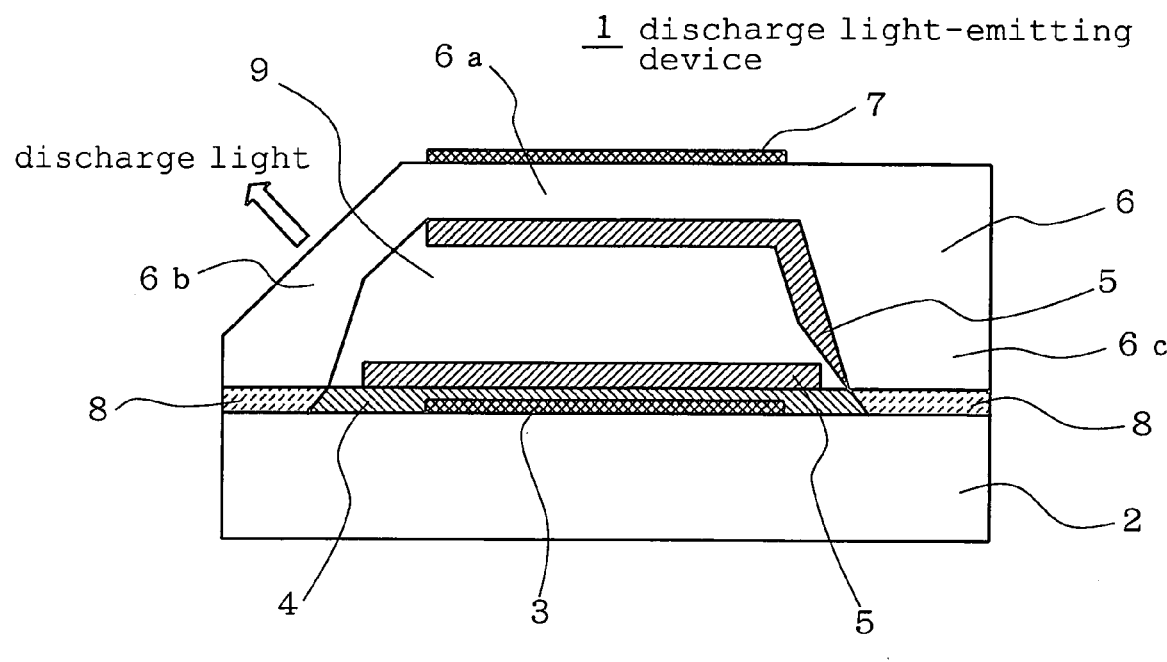
FIG. 6 is a sectional view showing a discharge light-emitting device according to the prior art.
Figure 7:
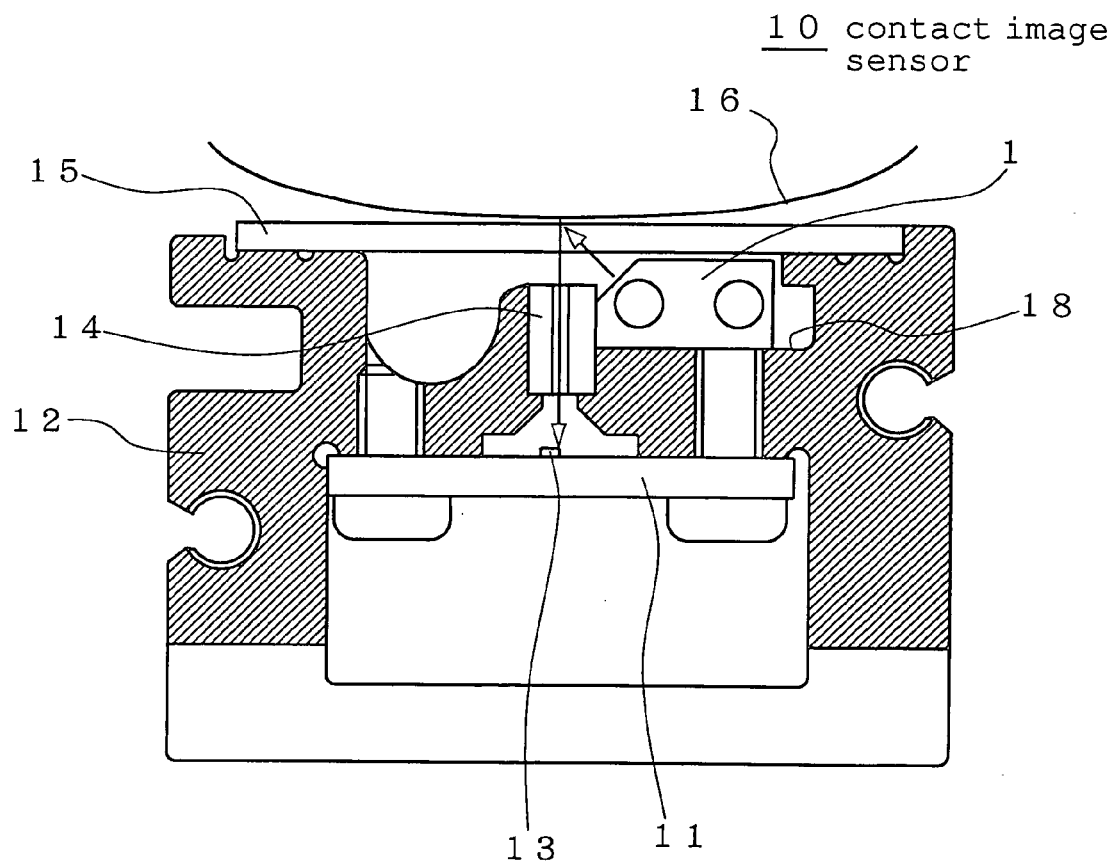
FIG. 7 is a sectional view of a contact image sensor in which the discharge light-emitting device shown in FIG. 6 is used as light source.

FIG. 5 is a sectional view showing a construction of another discharge light-emitting device according to Embodiment 2 of the invention. In the drawing, a discharge light-emitting device 51 is like the discharge light-emitting device 21 in the foregoing Embodiment 1, and the same reference numerals are designated to the same or like parts and detailed description thereof is omitted herein. In this Embodiment 2, the first electrodes 26a, 26b and the dielectric layers 27a, 27b are formed leaving the central part extending in longitudinal direction of the first substrate 22 on the discharge space side of the first substrate 22 as a clearance. Further, the first fluorescent layers 30a, 30b are formed on the dielectric layers 27a, 27b leaving the central part extending in longitudinal direction of the first substrate 22 on the discharge space side of the first substrate 22 as a clearance. Such a construction can provides the same operation as in the discharge light-emitting device according to the foregoing Embodiment 1 and the contact image sensor using the discharge light-emitting device.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A discharge light-emitting device comprising:
   a transparent first substrate;
   at least two first electrodes formed on said first substrate in parallel to each other and configured to form a first clearance between the at least two first electrodes, the first clearance extending in a longitudinal direction of said first substrate;
   a transparent second substrate;
   at least two second electrodes formed on said second substrate in parallel to each other and configured to form a second clearance between the at least two second electrodes, the second clearance extending in a longitudinal direction of said second substrate;
   sidewalls configured to form a discharge space with said first substrate, and said second substrate opposite to said first substrate so that said at least two first electrodes and said at least two second electrodes are opposite to each other and the at least two second electrodes are inside said discharge space;
   at least two first fluorescent layers formed on a discharge space side of said first substrate in parallel to each other so as to be opposite to said at least two first electrodes relative to said first substrate and configured to form a third clearance between the at least two first fluorescent layers, the third clearance extending in the longitudinal direction of said first substrate; and
   at least two second fluorescent layers formed on a discharge space side of said second substrate in parallel to each other so as to correspond to said at least two second electrodes and configured to form a fourth clearance between the at least two second fluorescent layers, the fourth clearance extending in the longitudinal direction of the second substrate,
   wherein light emitted from said at least two of first and second fluorescent layers on both sides of the third and fourth clearances is reflected from an original located on a side of said second substrate opposite to the discharge space side, and the reflected light passes through the third and fourth clearances and reaches a side of the first substrate opposite to the discharge space side.

2. The discharge light-emitting device according to claim 1, wherein said second substrate is configured as a glass plate having a surface an which an original to be read is carried.

3. The discharge light-emitting device according to claim 1, further comprising:
   at least two first dielectric layers formed in parallel to each other and configured to form a fifth clearance between the at least two first dielectric layers, the fifth clearance extending in the longitudinal direction of said first substrate, said at least two first dielectric layers coating said at least two first electrodes; and
   at least two second dielectric layers formed in parallel to each other and configured to form a sixth clearance between the at least two second dielectric layers, the sixth clearance extending in the longitudinal direction of said second substrate, said at least two first second dielectric layers coating said at least two second electrodes.

4. The discharge light-emitting device according to claim 3, wherein said at least two first and second dielectric layers are configured as light shielding layers having a black color tone.

5. The discharge light-emitting device according to claim 3, wherein said fifth clearance is shorter than said third clearance and said sixth clearance is shorter than said fourth clearance.

6. The discharge light-emitting device according to claim 3, wherein said fifth clearance is shorter than said fourth clearance.

7. The discharge light-emitting device according to claim 1, wherein said at least two first electrodes on said first substrate are formed on the side of said first substrate opposite to said discharge space.

8. The discharge light-emitting device according to claim 1, wherein said at least two first electrodes on said first substrate are formed on the discharge space side of said first substrate.

9. The discharge light-emitting device according to claim 1, wherein said at least two second electrodes on said second substrate are formed on the discharge space side of said second substrate.

10. The discharge light-emitting device according to claim 1, wherein said at least two first electrodes on said first substrate extending in parallel are connected to each other at one end in the longitudinal direction, thereby forming a connection part that is configured to be connected to an outside high voltage power source.

11. The discharge light-emitting device according to claim 1, wherein said at least two second electrodes on said second substrate extending in parallel are connected to each other at one end in the longitudinal direction, thereby forming a connection part that is configured to be connected to an outside high voltage power source.

12. A discharge light-emitting device comprising:
   a transparent first substrate;
   at least two first electrodes formed on said first substrate in parallel to each other and configured to form a first clearance between the at least two first electrodes, the first clearance extending in a longitudinal direction of said first substrate;
   a transparent second substrate;
   at least two second electrodes formed on said second substrate in parallel to each other and configured to form a second clearance between the at least two second electrodes, the second clearance extending in a longitudinal direction of said second substrate;

sidewalls configured to form a discharge space with said first substrate, and said second substrate opposite to said first substrate so that said at least two first electrodes and said at least two second electrodes are opposite to each other and said at least two second electrodes are inside said discharge space;

at least two first fluorescent layers formed on a discharge space side of said first substrate in parallel to each other so as to be opposite to said at least two first electrodes relative to said first substrate and configured to form a third clearance between the at least two first fluorescent layers, the third clearance extending in the longitudinal direction of said first substrate; and at least two second fluorescent layers formed on a discharge space side of said second substrate in parallel to each other so as to correspond to said at least two second electrodes and configured to form a fourth clearance between the at least two second fluorescent layers, the fourth clearance extending in the longitudinal direction of said second substrate, wherein said third clearance is shorter than said fourth clearance.

13. The discharge light-emitting device according to claim 12, wherein said second substrate is configured as a glass plate having a surface on which an original to be read is carried.

14. A contact image sensor comprising:

a transparent first substrate;

at least two first electrodes formed on said first substrate in parallel to each other and configured to form a first clearance between the at least two first electrodes, the first clearance extending in a longitudinal direction of said first substrate;

a transparent second substrate;

at least two second electrodes formed on said second substrate in parallel to each other and configured to form a second clearance between the at least two second electrodes, the second clearance extending in a longitudinal direction of said second substrate being;

sidewalls configured to form a discharge space with said first substrate, and said second substrate opposite to said first substrate so that said at least two first electrodes and said at least two second electrodes are opposite to each other and said at least two second electrodes are inside said discharge space;

at least two first fluorescent layers formed on a discharge space side of said first substrate in parallel to each other so as to be opposite to said at least two first electrodes relative to said first substrate and configured to form a third clearance between the at least two first fluorescent layers, the third clearance extending in the longitudinal direction of said first substrate;

at least two second fluorescent layers formed on a discharge space side of said second substrate in parallel to each other so as to correspond to said at least two second electrodes and configured to form a fourth clearance between the at least two second fluorescent layers, the fourth clearance extending in the longitudinal direction of said second substrate;

a converging lens disposed in said first clearance on a side of the first substrate opposite to the discharge space side, said converging lens being configured to converge light reflected from an original placed on said second substrate; and a sensor configured to detect light reflected from said converging lens, wherein light emitted from said at least two first and second fluorescent layers on both sides of the third and fourth clearances is reflected at the original located on a side opposite to the discharge space side of said second substrate, and then the reflected light passes through the third and fourth clearances and is converged into said converging lens.

15. The contact image sensor according to claim 14, wherein said second substrate is configured as a glass plate having a surface on which the original to be read is carried.

16. The contact image sensor according to claim 14, further comprising:

at least two first dielectric layers formed in parallel to each other and configured to form a fifth clearance between the at least two first dielectric layers, the fifth clearance extending in the longitudinal direction of said first substrate, said at least two first dielectric layers coating said at least two first electrodes; and at least two second dielectric layers formed in parallel to each other and configured to form a sixth clearance between the at least two second dielectric layers, the sixth clearance extending in the longitudinal direction of said second substrate, said at least two second dielectric layers coating said second electrodes.

* * * * *